US012240422B1

(12) United States Patent
Peacemaker et al.

(10) Patent No.: US 12,240,422 B1
(45) Date of Patent: Mar. 4, 2025

(54) TWO SPEED TRAILER JACK WITH DOG CLUTCH

(71) Applicant: SOS Solutions, Inc., Tonasket, WA (US)

(72) Inventors: Samuel R. Peacemaker, Gilbert, AZ (US); Benjamin Peacemaker, Chandler, AZ (US); Travis Ernest Yoch, Woodbury, MN (US); Preston Elijan Collins-Holt, Saint Paul, MN (US); Casimir August Sienkiewicz, Minneapolis, MN (US)

(73) Assignee: SOS Solutions, Inc., Tonasket, WA (US)

( * ) Notice: Subject to any disclaimer, the term of this patent is extended or adjusted under 35 U.S.C. 154(b) by 0 days.

(21) Appl. No.: 18/905,079

(22) Filed: Oct. 2, 2024

(51) Int. Cl.
*B60S 9/08* (2006.01)
*B60D 1/66* (2006.01)

(52) U.S. Cl.
CPC . *B60S 9/08* (2013.01); *B60D 1/66* (2013.01)

(58) Field of Classification Search
CPC .................................. B60S 9/08; B60D 1/66
See application file for complete search history.

(56) References Cited

U.S. PATENT DOCUMENTS

| 1,796,173 | A | * | 3/1931 | Warren | B66F 3/08 248/354.3 |
|---|---|---|---|---|---|
| 5,035,094 | A | * | 7/1991 | Legare | F16H 25/2056 343/903 |
| 6,761,387 | B2 | * | 7/2004 | Sloss | B60P 1/02 296/26.05 |
| 10,899,320 | B1 | * | 1/2021 | Speirs | B60S 9/08 |
| 11,691,857 | B2 | * | 7/2023 | Peacemaker | B60S 9/08 254/424 |
| 2012/0132873 | A1 | * | 5/2012 | Few | B66F 3/10 254/102 |
| 2023/0078769 | A1 | * | 3/2023 | Peacemaker | B66F 3/08 254/98 |

* cited by examiner

*Primary Examiner* — Bryan A Evans
(74) *Attorney, Agent, or Firm* — Snell & Wilmer LLP

(57) ABSTRACT

A linear jack includes a coarse nut threadedly coupled to a first rotating screw and a first sleeve movable with respect to the coarse nut (the first rotating screw, the first sleeve, and the coarse nut collectively a high-speed assembly), and a second sleeve threadedly coupled to a second rotating screw (the second sleeve and the second rotating screw collectively a low-speed assembly). The coarse nut is movable to a first position where the coarse nut is held from rotating with the first rotating screw—e.g., via a dog clutch—to convert rotational motion of the first rotating screw into translating motion of the coarse nut and the first sleeve. The coarse nut is movable to a second position where the coarse nut is free to rotate together with the second rotating screw and the first rotating screw with respect to the first sleeve.

20 Claims, 9 Drawing Sheets

TWO SPEED TRAILER JACK WITH DOG CLUTCH

FIELD

The present disclosure relates generally to apparatuses such as jacks for lifting and suspending vehicles, trailers, and other large objects, and, more specifically, to linear jacks that are used to selectively lower and raise, for example, a portion of a trailer.

BACKGROUND

Many of the different types of trailers that are towed by trucks are connected to the trucks by a releasable coupling such as a gooseneck coupling, a fifth wheel coupling, a bumper pull coupling and the like. After the trailer is released from the truck and is no longer supported by the truck at the forward end of the trailer, a lifting device, such as a jack and/or landing gear assembly, is often used to support the trailer floor or bed, typically in a position generally horizontal to the ground.

A typical lifting device is attached to the trailer adjacent the truck coupling at the forward end of the trailer. The lifting device includes one or more vertically oriented columns, and a vertical leg is mounted on the column. A hand crank is typically connected to the gear mechanism. Selectively rotating the hand crank lowers the leg until the leg contacts the ground and supports the forward end of the trailer when the trailer is being uncoupled from the truck or raises the leg when the trailer has been connected to a truck and is ready for towing.

SUMMARY

One aspect of the subject matter described in this specification is embodied in a linear jack. The linear jack can include an outer tube defining a centerline axis, a first rotating screw, a coarse nut, a first sleeve, a second rotating screw, and a second sleeve. The first rotating screw is configured to rotate relative to the outer tube. The coarse nut is threadedly coupled to the first rotating screw. The first sleeve is received at least partially into the outer tube. The first sleeve is configured to translate with respect to the outer tube between a first retracted position and a first extended position. The second rotating screw is configured to rotate together with the first rotating screw. The second sleeve is received at least partially into the first sleeve. The second sleeve is threadedly coupled to the second rotating screw. The first sleeve is movable between a first position and a second position for engaging and disengaging, respectively, a high-speed assembly of the linear jack.

These and other embodiments may optionally include one or more of the following features.

The first sleeve can be configured to translate with respect to the coarse nut between the first position, wherein the coarse nut is meshingly engaged with the first sleeve, and the second position, wherein the coarse nut is free to rotate together with the second rotating screw and the first rotating screw with respect to the first sleeve.

The first rotating screw can be mounted to the outer tube and extending coaxially along the centerline axis.

The second sleeve can be configured to translate with respect to the first sleeve between a second retracted position and a second extended position.

The second sleeve can be configured to translate with respect to the second rotating screw in response to rotation of the first rotating screw. The second sleeve can be configured to translate with respect to the second rotating screw in response to rotation of the first rotating screw and the second rotating screw.

With the first sleeve in the first position, the first sleeve can be configured to translate with respect to the outer tube in response to the first rotating screw rotating relative to the coarse nut.

The second rotating screw can be configured to translate with respect to the first rotating screw in response to rotation of the first rotating screw with respect to the outer tube. The second rotating screw can be configured to translate with respect to the first rotating screw in response to rotation of the first rotating screw with respect to the coarse nut. The second rotating screw can be configured to receive at least a portion of the first rotating screw.

The second rotating screw can be in coaxial alignment with the first rotating screw. The first rotating screw can be configured to drive rotation of the second rotating screw.

The linear jack can further include a dog clutch disposed between the first sleeve and the coarse nut, and with the first sleeve in the first position the dog clutch secures the coarse nut from rotating together with the first rotating screw. The dog clutch can include a first plurality of teeth extending from the coarse nut and a second plurality of teeth extending from the first sleeve. The first plurality of teeth can be interlocked with the second plurality of teeth in response to the first sleeve moving to the first position. The first plurality of teeth can be disengaged from the second plurality of teeth in response to the first sleeve moving to the second position so that the coarse nut is free to rotate together with the second rotating screw and the first rotating screw.

A first thread pitch of the first rotating screw is greater than a second thread pitch of the second rotating screw.

The coarse nut can provide a stopping surface that engages a head portion of the second rotating screw to stop the second rotating screw from translating with respect to the first sleeve when the first sleeve moves to the second position.

Turning the first rotating screw a first rotational direction extends the second sleeve from the first sleeve and turning the first rotating screw a second rotational direction retracts the second sleeve into the first sleeve, regardless of the first sleeve being in the first position or the second position.

The outer tube, the first sleeve, the second sleeve, the first rotating screw, and the second rotating screw can be in coaxial alignment.

The second rotating screw can include a cylindrical groove whereby the second rotating screw is slidingly interlocked with the first sleeve.

With the first sleeve in the first position, the first rotating screw and the second rotating screw can rotate relative to the coarse nut so as to cause the coarse nut, the first sleeve, and the second rotating screw to translate relative to the first rotating screw.

The second rotating screw can be slidingly coupled to the first rotating screw.

At least one tab can extend from the first sleeve into the cylindrical groove whereby the first sleeve is slidingly interlocked with the second rotating screw.

The coarse nut can comprise a hollow shaft portion having a threaded inner diameter surface configured to interface with a thread of the first rotating screw and a flange extending outwardly from the hollow shaft portion. The flange can be disposed at least partially in the first sleeve.

In another aspect, the subject matter is embodied in a method of manufacturing a linear jack. The method can include disposing a first rotating screw at least partially within a coarse nut, wherein the first rotating screw is threadedly coupled to the coarse nut. The method can include disposing a second rotating screw at least partially within a second sleeve, wherein the second rotating screw is threadedly coupled to the second sleeve. The method can include disposing the first rotating screw at least partially within the second rotating screw, wherein the first rotating screw is slidingly coupled to the second rotating screw. The method can include disposing the second sleeve at least partially within a first sleeve, wherein the second sleeve is configured to translate with respect to the first sleeve, and the first sleeve is movable between a first position, wherein the coarse nut is meshingly engaged with the first sleeve, and a second position, wherein the coarse nut is free to rotate together with the second rotating screw and the first rotating screw with respect to the first sleeve.

In various embodiments, the method can further include disposing the first sleeve within an outer tube, wherein the first sleeve is configured to translate with respect to the outer tube, and the second sleeve is configured to translate together with the first sleeve with respect to the outer tube. The method can further include coupling the first rotating screw to the outer tube, wherein the first rotating screw is configured to rotate with respect to the outer tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be example in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
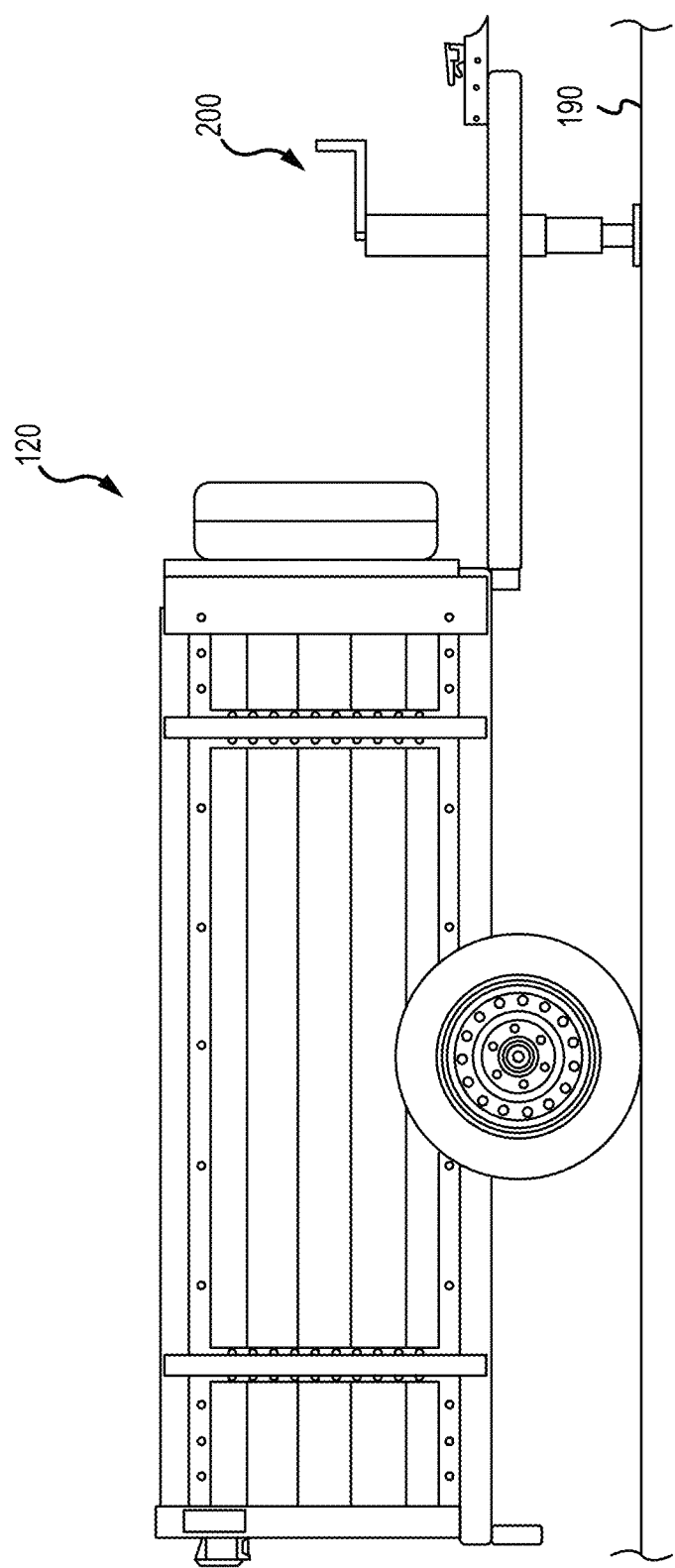
FIG. 1 is a schematic view of a trailer-mounted lifting device supporting a front end of a trailer on a ground surface, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Typical lifting devices, such as linear trailer jacks, operate using a constant thread pitch sized to obtain sufficient mechanical advantage to lift a heavy load, such as a trailer. In that regard, as a smaller thread pitch increases mechanical advantage relative to a larger thread pitch, many available linear trailer jacks use a constant, small thread pitch. However, the gain in mechanical advantage is offset by the increase in the number of rotations of an input device (e.g., a handle) needed to extend (translate) the linear trailer jack. In this manner, conventional linear trailer jack may provide the mechanical advantage desired to lift a trailer but at the expense of time consuming, and bothersome, turning.

Thread pitch, as used herein, is generally defined as the distance between threads on a threaded coupling, such as that found on a screw, lead screw, or jack screw. Thread count, expressed for example as threads per inch, is generally defined as the number of threads per inch of linear distance on a threaded coupling, such as that found on a screw, lead screw, or jack screw. In that regard, thread pitch and thread count are related, both expressing the spacing of threads about a screw, lead screw, or jack screw.

The terms "coarse nut" and "fine nut" are used herein to refer to threaded devices having helical ridges or threads disposed on an inner diameter surface thereof. As the name implies, a coarse nut has fewer threads per inch than a fine nut. In this regard, the terms "coarse" and "fine" each refer to a thread pitch of the respective nut.

Systems and methods for a two-speed lifting device—such as a linear trailer jack—are provided herein. A lifting device of the present disclosure generally comprises a high-speed assembly and a low-speed assembly. The high-speed assembly generally comprises a screw mechanism comprising a nut threadedly coupled to a screw. In various embodiments, the screw rotates and the nut translates. The screw and nut are threadedly coupled for translating the rotational force to a linear force. The low-speed assembly also comprises a nut threadedly coupled to a screw. A thread pitch of the high-speed assembly is greater than a thread pitch of the low-speed assembly, in various embodiments. In this manner, when driven by a common shaft and/or at the same revolutions per unit time, the high-speed assembly causes the lifting device to extend a greater linear distance per rotation of a shaft than the low-speed assembly.

In this manner, the high-speed assembly causes more linear extension per rotation and thus reduces the number of rotations needed to lower or raise the lifting device. This reduces or eliminates the wasted time incurred if no such high-speed assembly existed. However, in response to the lifting device beginning to touch the ground, and mechanical advantage now becomes more important, in various embodiments, the high-speed assembly is disengaged, for example, automatically disengaged. Thus, in response to the lifting device contacting a ground surface, a force is reacted into the high-speed assembly, thereby moving a moveable member of the high-speed assembly from a first position to a second position and disengaging the high-speed assembly from being drivably coupled with the shaft and/or other motive rotational force. With the moveable member of the high-speed assembly in the second position, only the low-speed assembly is driven in response to rotation of the shaft, thereby benefiting from the mechanical advantage of the low-speed assembly, which has a smaller thread pitch than the high-speed assembly. In this manner, lifting devices of the present disclosure may quickly and efficiently extend in overall length, reducing the number of turns required to reach a ground surface, while still providing the mechanical advantage to lift heavy loads. In various embodiments, this transition occurs without any additional action and thus improves ease of use and reduces overall time needed for operation. In this manner, lifting devices of the present disclosure may automatically switch from a high-speed mode to a low-speed mode in response to the ground force being reacted through the lifting device (i.e., in response to contacting the ground as the jack is extended).

With reference to FIG. 1, a trailer 120 partially supported on a ground surface 190 by a lifting device 100 is illustrated, in accordance with various embodiments. Lifting device 100 may be coupled to a front end of the trailer 120. Lifting device 100 may be generally vertically oriented when supporting the front end of the trailer 120. Although illustrated coupled to a utility type trailer, lifting devices of the present disclosure may be utilized on any trailer or vehicle where support is desired, for example, with a camper, recreational vehicle, toy hauler, boat, or any other device capable of being towed as a trailer.

Figure 2:
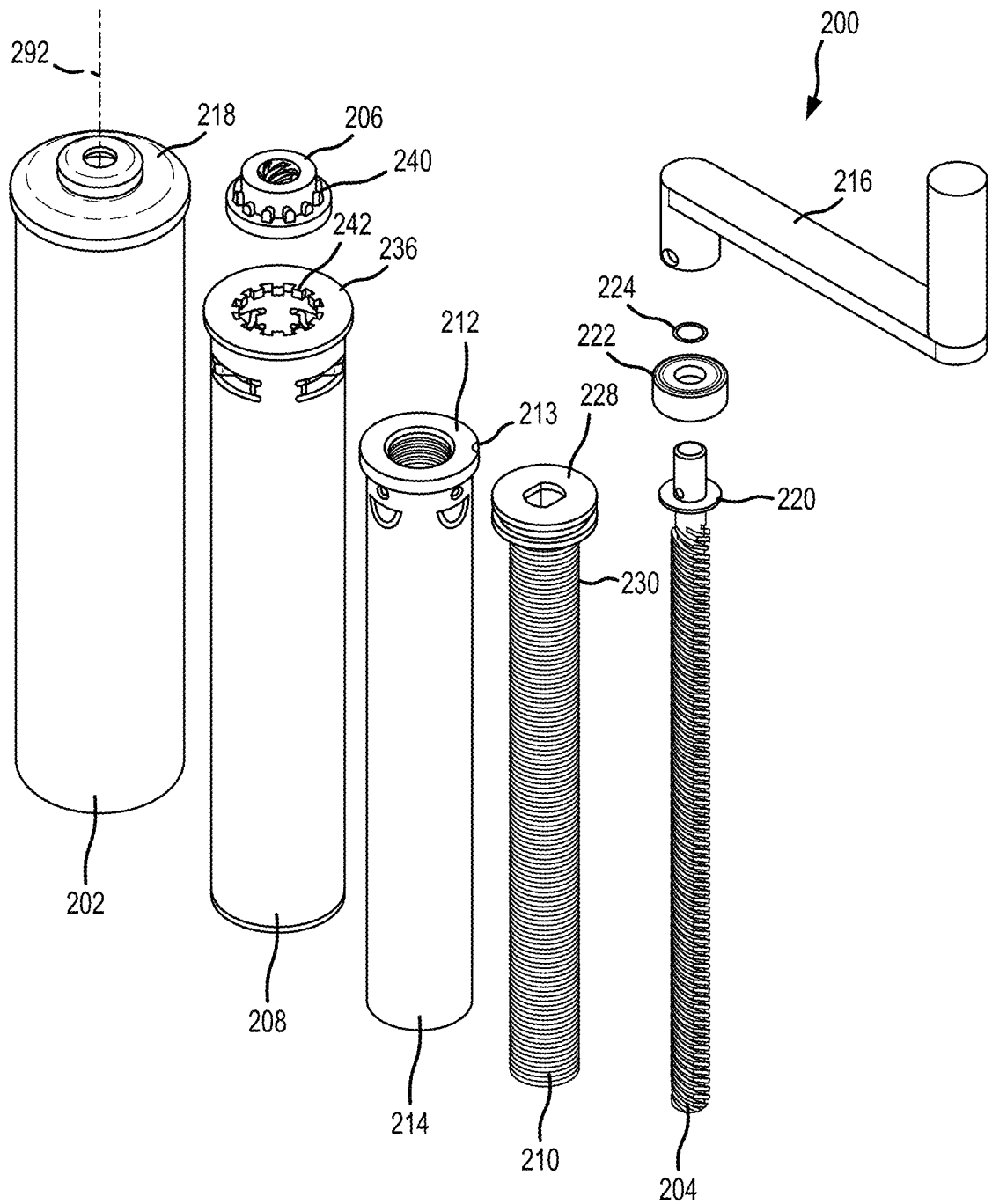
FIG. 2 is an exploded view of a lifting device, in accordance with various embodiments.

With reference to FIG. 2, an exploded view of a lifting device 200 is illustrated, in accordance with various embodiments. Lifting device 200 may be a linear jack. Lifting device 200 may generally comprise an outer tube 202, a high-speed assembly generally comprising a first rotating screw 204, a coarse nut 206, and a first sleeve 208, and a low-speed assembly generally comprising a second rotating screw 210, a fine nut 212, and a second sleeve 214. The high-speed assembly may generally comprise a screw mechanism comprising the first rotating screw 204 threadedly coupled to the coarse nut 206, in the manner of a leadscrew or jack screw. In various embodiments, the first sleeve 208 is configured to translate together with the coarse nut 206. The first sleeve 208 can be a translating sleeve configured to translate with respect to the outer tube 202. In various embodiments, the first sleeve 208 is secured from rotating with respect to the outer tube 202. The low-speed assembly may generally comprise a screw mechanism comprising the second rotating screw 210 threadedly coupled to the fine nut 212. The second sleeve 214 is configured to translate together with the fine nut 212. The second sleeve 214 can be a translating sleeve configured to translate with respect to the outer tube 202 and/or the first sleeve 208. In various embodiments, the second sleeve 214 is secured from rotating with respect to the outer tube 202 and/or the first sleeve 208. The fine nut 212 can be coupled to an upper end of the second sleeve 214, e.g., via a threaded connection, fasteners, and/or a metal joining process, such as welding, brazing, soldering, etc. The fine nut 212 can include a keyway 213 whereby the fine nut 212 and the second sleeve 214 are secured from rotating with respect to the first sleeve 208. For example, the fine nut 212 and the second sleeve 214 can be coupled together via a keyed connection (i.e., the keyway 212 and an associated key disposed in an inner diameter surface of the second sleeve 214) that permits translating motion of the fine nut 212 with respect to the second sleeve 214, but that mechanically blocks the fine nut 212 from rotating with respect to the second sleeve 214.

The outer tube 202 may define a centerline axis 292. The outer tube 202 is hollow and is configured to telescopingly receive the first sleeve 208 and the second sleeve 214. The first sleeve 208 may be disposed at least partially within the outer tube 202. The first sleeve 208 may be hollow. The second sleeve 214 may be disposed at least partially within the first sleeve 208. The second sleeve 214 may be hollow. The second rotating screw 210 may be disposed at least partially within the second sleeve 214. The second rotating screw 210 may be hollow. The first rotating screw 204 may be disposed at least partially within the second rotating screw 210. The first rotating screw 204 may be slidingly engaged with the second rotating screw 210. The second rotating screw 210 can be configured to rotate together with the first rotating screw 204 about the centerline axis 292. The inner dimension of the outer tube 202 may be greater than the outer dimension of the first sleeve 208. The inner dimension of the first sleeve 208 may be greater than the outer dimension of the second sleeve 214. The inner dimension of the second sleeve 214 may be greater than the outer dimension of the second rotating screw 210. The inner dimension of the second rotating screw 210 may be greater than the outer dimension of the first rotating screw 204. The outer tube 202, the first sleeve 208, the second sleeve 214, the second rotating screw 210, the coarse nut 206, and the fine nut 212 can be coaxially aligned and/or substantially coaxially aligned, but in various embodiments coaxial alignment may not be present.

Figure 3A:
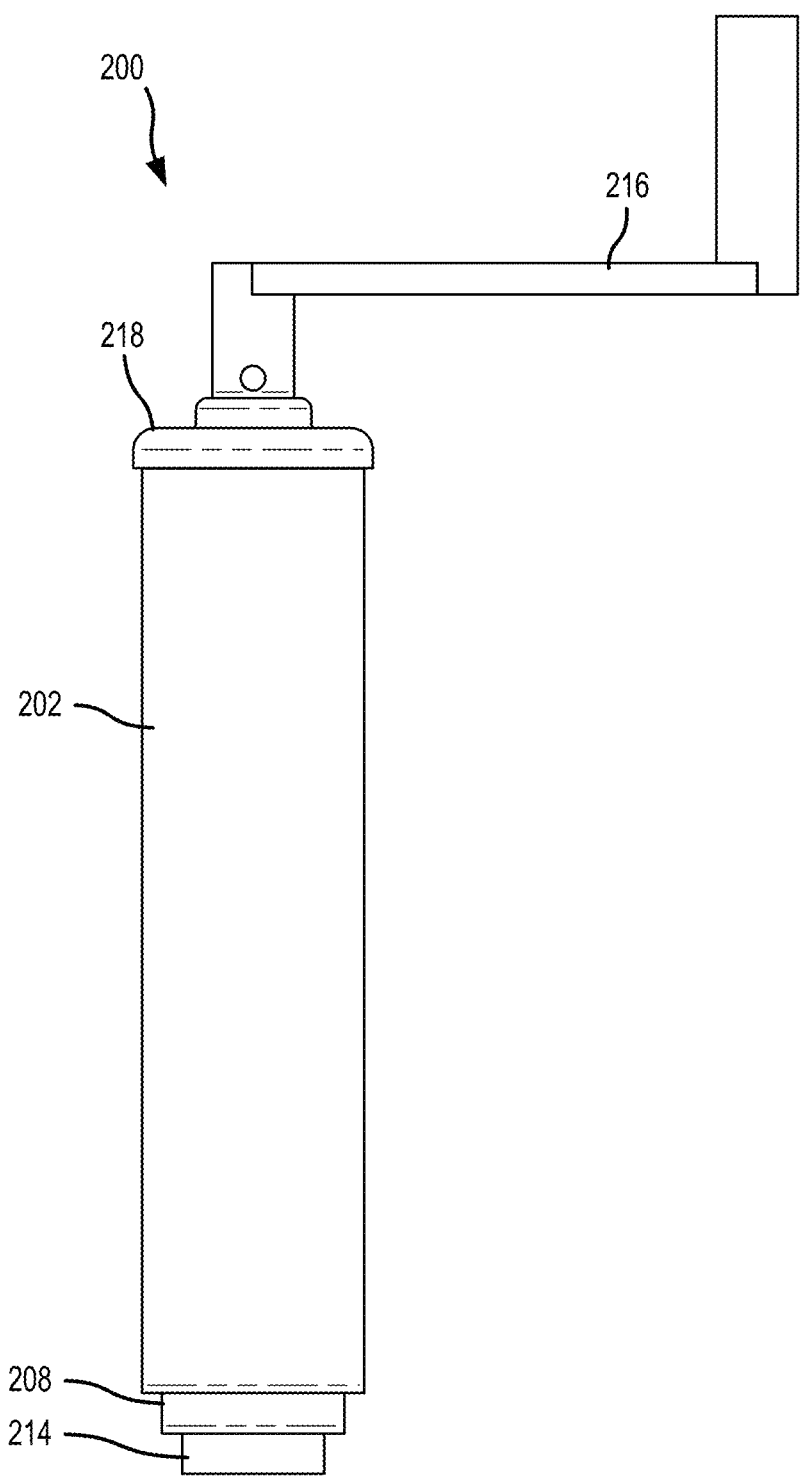
FIG. 3A and FIG. 3B are side and section views, respectively, of the lifting device in a retracted state, in accordance with various embodiments.
Figure 3B:
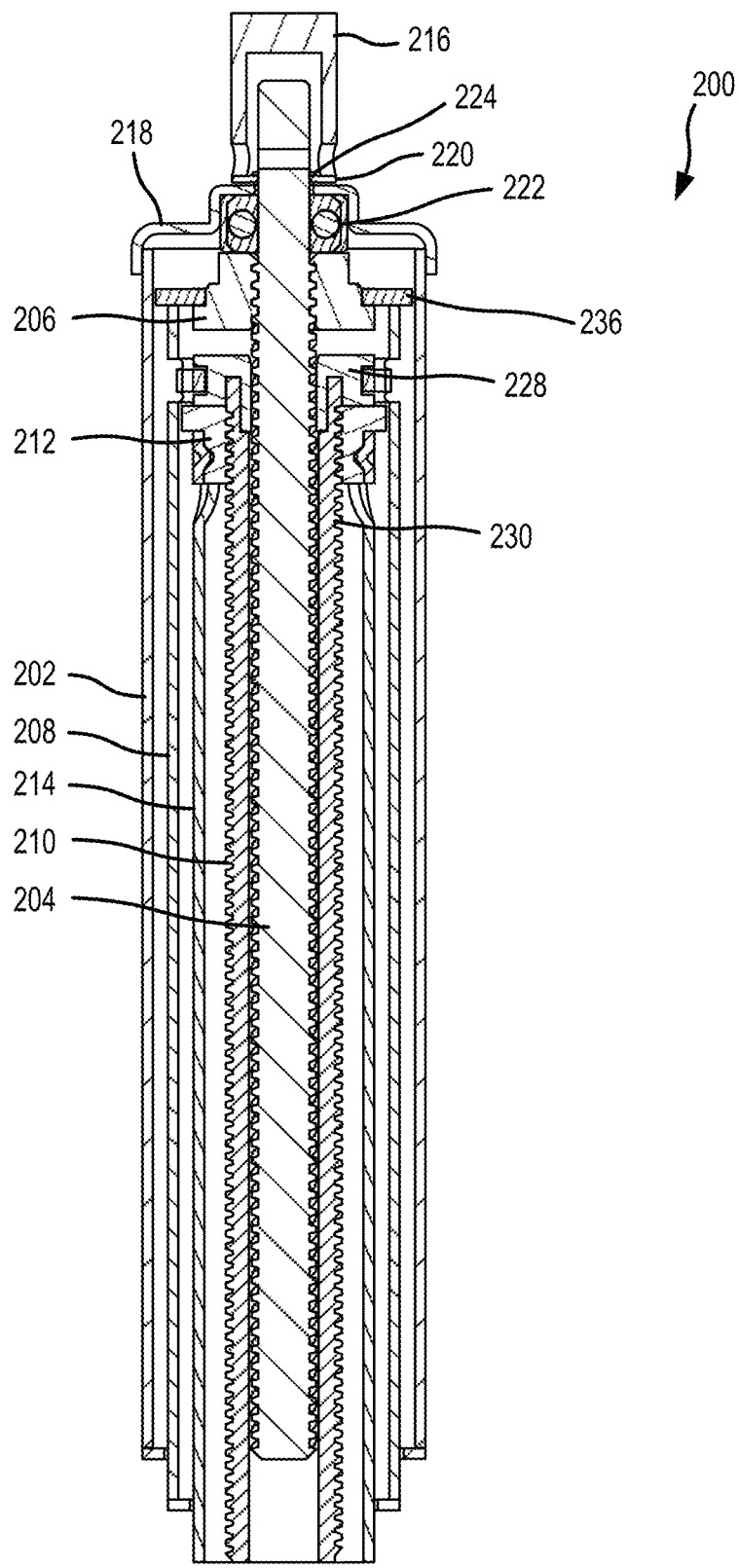
Figure 4:
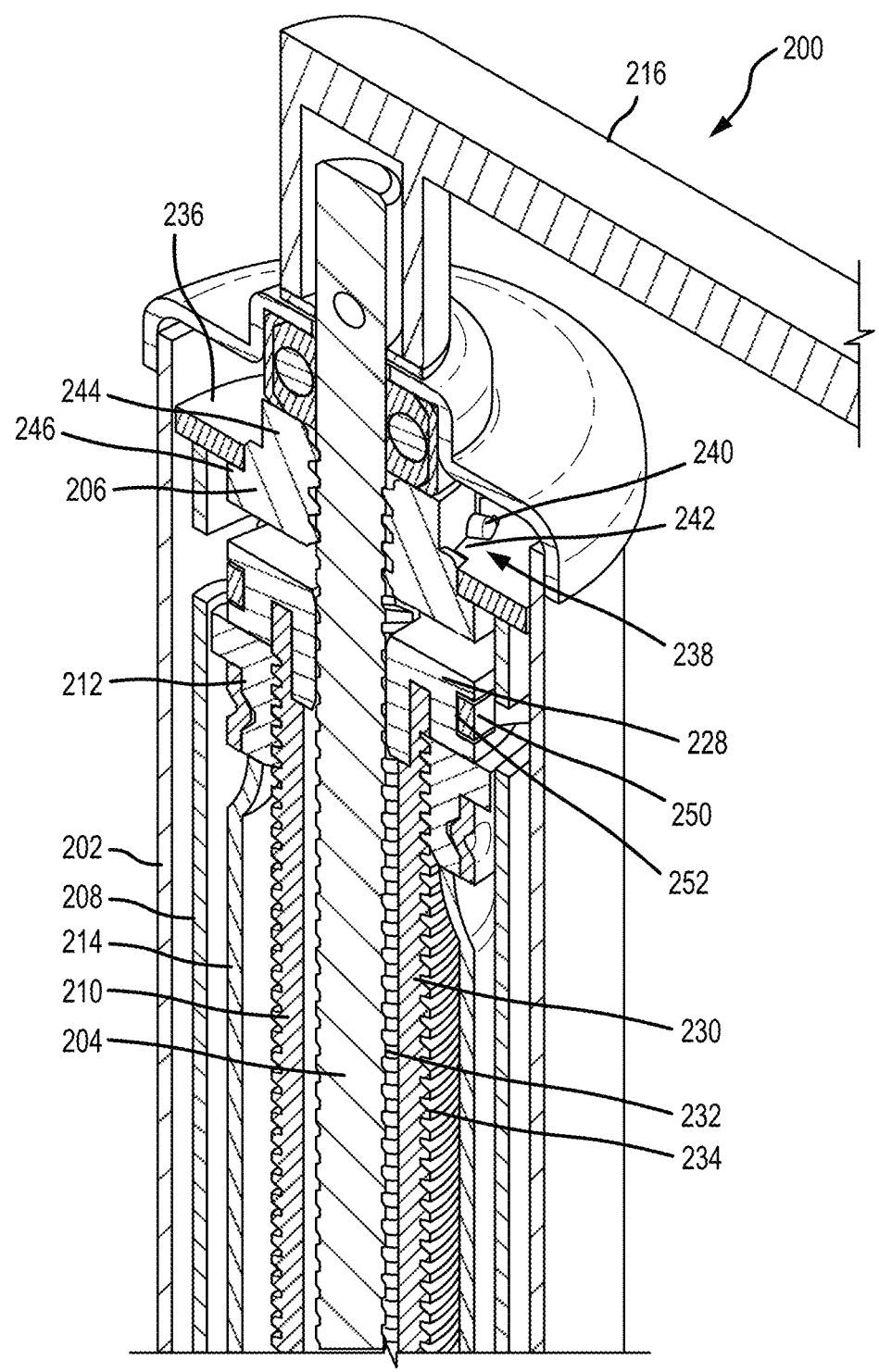
FIG. 4 is enlarged section view of the top portion of the lifting device of FIG. 3B, with the lifting device in a retracted state, in accordance with various embodiments.

FIG. 3A and FIG. 3B are side and section views, respectively, of the lifting device 200 in an assembled state and in a retracted position, in accordance with various embodiments. FIG. 4 is a section view of an upper portion of the lifting device 200 in the assembled state and in the retracted position, in accordance with various embodiments. With combined reference to FIG. 2 through FIG. 4, one end of the first rotating screw 204 may bear a handle 216 which may be used for rotating the first rotating screw 204. The handle 216 can be removably coupled to an upper end of the first rotating screw 204, which can aid in manufacturability and/or assembly of the lifting device 200. The outer tube 202 can include a retaining member, such as a cap 218 coupled to an upper end thereof. The cap 218 can be coupled to the outer tube 202, e.g., via a threaded connection, fasteners, and/or a metal joining process, such as welding, brazing, soldering, etc. The cap 218 may comprise a flange extending inward from an inner surface of outer tube 202. The first rotating screw 204 can extend through the cap 218. The first rotating screw 204 can be mounted to the outer tube 202 via the cap 218.

In various aspects, and with particular focus on FIG. 3B, a first washer 220 can be positioned at an outer surface of the cap 218. The first rotating screw 204 can extend through the cap 218 and the first washer 220. A lock ring 224 can be snapped in place on the first rotating screw 204, for example received in a cylindrical groove disposed in the first rotating screw 204, for providing a stopping surface to prevent the top end of the first rotating screw 204 from sliding through the cap 218. The lock ring 224 can be removed to disassemble the lifting device 200. The lock ring 224 can contact the first washer 220. A bearing 222 can be located inside the outer tube 202. The bearing 222 can be located at an inner surface of the cap 218. The cap 218 can be sandwiched between the bearing 222 and the first washer 220. The bearing 222 can be disposed between the cap 218 and the coarse nut 206. In various embodiments, the bearing 222 can be coupled—e.g., press fit—to the cap 218. The bearing 222 can secure the first rotating screw 204 in position and facilitate rotation of the first rotating screw 204 about the centerline axis 292.

The coarse nut 206 can be threadedly coupled to the first rotating screw 204. Thus, rotation of the first rotating screw 204 can cause the coarse nut 206 to translate with respect to the outer tube 202 and the first rotating screw 204. The first sleeve 208 is coupled to the coarse nut 206 such that the first sleeve 208 translates together with the coarse nut 206 with respect to the outer tube 202 and the first rotating screw 204 between the retracted state (see FIG. 3B) and an extended state (see FIG. 8B). Stated differently, the high-speed assembly translates rotational motion of the first rotating screw 204 to linear motion of the coarse nut 206 and the first sleeve 208.

The second rotating screw 210 can rotate together with the first rotating screw 204. The first rotating screw 204 can drive rotating of the second rotating screw 210. Stated differently, the first rotating screw 204 can be configured to impart a rotating force (e.g., a torque force) into the second rotating screw 210 to cause the second rotating screw 210 to rotate together with the first rotating screw 204. In various embodiments, the second rotating screw 210 is slidingly coupled to the first rotating screw 204, for example via a keyed connection or a splined connection. The second rotating screw 210 can include a head portion 228 and a shaft portion 230. The head portion 228 can define an end of the second rotating screw 210. The head portion 228 can comprise a flange that extends outwardly from the shaft portion 230 to interface with the first sleeve 208. The flange can extend inwardly from the shaft portion 230 to interface with the first rotating screw 204. With momentary reference to FIG. 5, a perspective view of the second rotating screw 210 is illustrated, in accordance with various embodiments. The head portion 228 can define a center aperture 502. The center aperture 502 can be sized and shaped to receive the first rotating screw 204 (see FIG. 6).

Figures 5, 6:
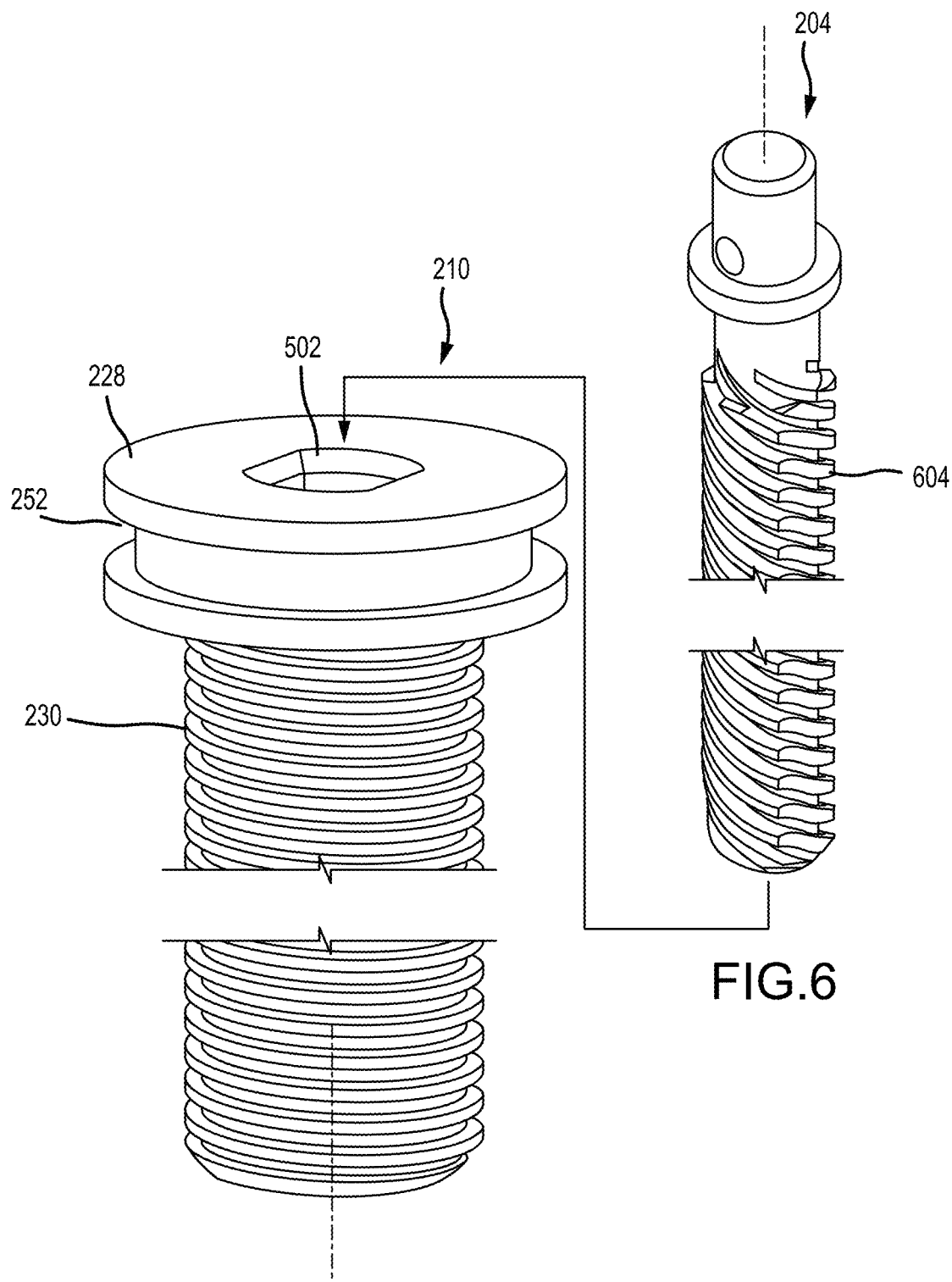
FIG. 5 is a perspective view of a second rotating screw for a lifting device, in accordance with various embodiments.
FIG. 6 is a perspective view of a first rotating screw for a lifting device, in accordance with various embodiments.

With momentary reference to FIG. 6, a perspective view of the first rotating screw 204 is illustrated, in accordance with various embodiments. The first rotating screw 204 includes a threaded shaft 604 that is sized and shaped to be complementary to the center aperture 502 (see FIG. 5). With combined reference to FIG. 5 and FIG. 6, the center aperture 502 is configured to receive the threaded shaft 604. The head portion 228 can slide along the threaded shaft 604 as the second rotating screw 210 translates with respect to the first sleeve 208 between the retracted and extended positions. The center aperture 502 is sized and shaped to slidingly interlock with the threaded shaft 605 so that the second rotating screw 210 rotates together with the first rotating screw 204. In this regard, the center aperture 502 can accommodate sliding motion of the head portion 228 with respect to the first rotating screw 204, while also preventing rotation of the head portion 228 with respect to the first rotating screw 204. A torque force applied to the first rotating screw 204 can be transmitted into the head portion 228 via the center aperture 502 and the threaded shaft 605 to cause the second rotating screw 210 to rotate together with the first rotating screw 204. For example, the center aperture 502 can define a keyed connection between the threaded shaft 604 and the head portion 228. Furthermore, although illustrated as having two opposing flat surfaces, the keyed connection between the center aperture 502 and the threaded shaft 604 may comprise various geometries such as a star shaped pattern, triangular, square, or any other geometry that slidingly interlocks the head portion 228 with the first rotating screw 204. In various embodiments, the center aperture 502 can include grooves or splines for a splined connection between the first rotating screw 204 and the second rotating screw 210. Any suitable connection is contemplated such that the first rotating screw 204 slidingly interlocks with the head portion 228 to impart rotational forces (i.e., torque) therebetween.

With particular focus on FIG. 4, the second sleeve 214 is threadedly coupled to the second rotating screw 210. The second sleeve 214 can be threadedly coupled to the second rotating screw 210 via the fine nut 212. For example, the fine nut 212 can be coupled to an inner surface of the second sleeve 214. Thus, rotation of the second rotating screw 210 causes the second sleeve 214 to translate with respect to outer tube 202 and the second rotating screw 210. Stated differently, the low-speed assembly translates rotational motion of the second rotating screw 210 to linear motion of the second sleeve 214.

In various embodiments, the first rotating screw 204 comprises helically extending grooves and/or threads 232. In various embodiments, the second rotating screw 210 comprises helically extending grooves and/or threads 234. The thread pitch of threads 232 may be greater than the thread pitch of threads 234. Stated differently, the second rotating screw 210 may comprise more threads per inch (TPI) than the first rotating screw 204. In various embodiments, the thread pitch of the threads 232 is between 101% and 1000% as large as the thread pitch of the threads 234, though various embodiments, the thread pitch of the threads 232 is between 200% and 500% as large as the thread pitch of the threads 234. In various embodiments, the thread pitch of the threads 232 is more than twice as large as the thread pitch of the threads 234. In various embodiments, the thread pitch of the threads 232 is more than three times as large as the thread pitch of the threads 234. In various embodiments, the thread pitch of the threads 232 is more than four times as large as the thread pitch of the threads 234. It should be understood that the maximum thread pitch may be limited by the moment arm for torque applied to the first rotating screw 204 and may be limited to reduce the torque requirement for rotating the first rotating screw 204 below a desired threshold. In this manner, the high-speed assembly translates further and faster per rotation of the first rotating screw 204 than the low-speed assembly, causing the lifting device 200 to reach a ground surface faster than if the high-speed assembly were not present. Furthermore, in response to the lifting device 200 contacting a ground surface and the high-speed assembly disengaging from the first rotating screw 204, the reduced thread pitch of the low-speed assembly takes advantage of the reduced torque required for extending the lifting device 200.

In various embodiments, the thread pitch of the threads 232 may be between 0.1 millimeters (mm) and 304.8 mm (between 0.0039 inches and 12 inches) in accordance with various embodiments, between 1 mm and 101.6 mm (between 0.039 inches and 4 inches) in accordance with various embodiments, between 2 mm and 76.2 mm (between 0.0787 inches and 3 inches) in accordance with various embodiments, and/or between 4 mm and 50.8 mm (between 0.157 inches and 2 inches) in accordance with various embodiments.

The thread pitch of the threads 234 may be between 0.1 millimeters (mm) and 279.4 mm (between 0.0039 inches and 11 inches) in accordance with various embodiments, between 1 mm and 25.4 mm (between 0.039 inches and 1 inch) in accordance with various embodiments, between 1 mm and 6.35 mm (between 0.039 inches and 0.25 inches) in accordance with various embodiments, and/or between 2 mm and 3.175 mm (between 0.0787 inches and 0.125 inches) in accordance with various embodiments.

Figure 8A:
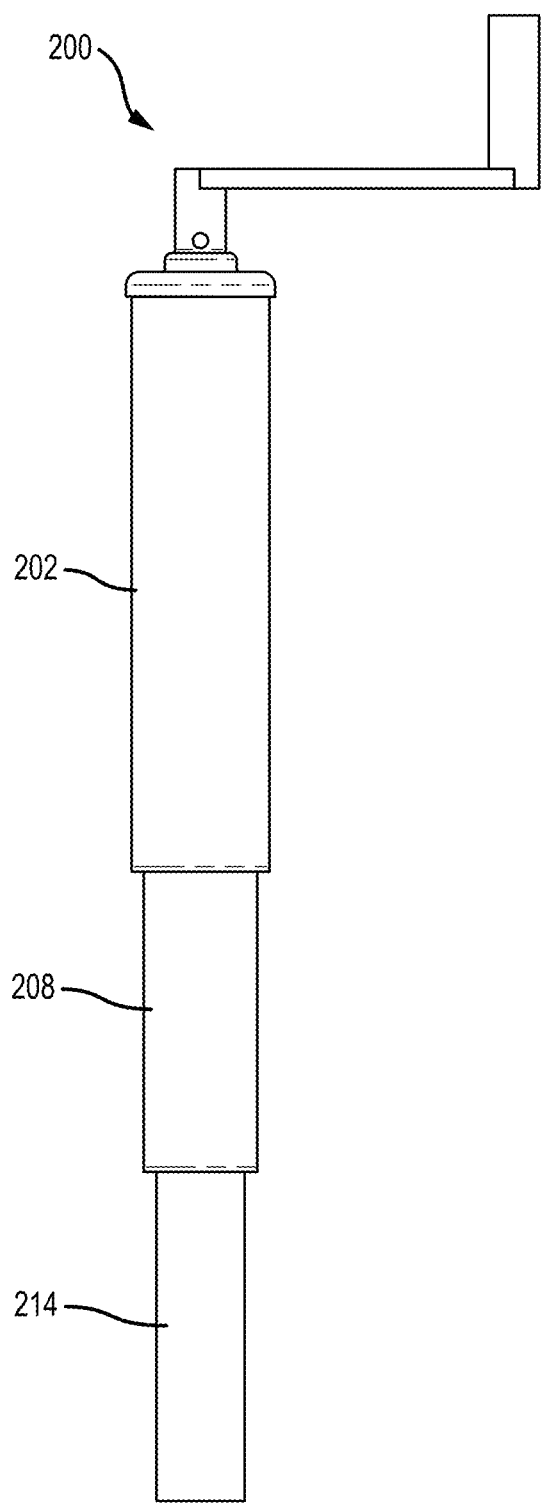
FIG. 8A and FIG. 8B are side and section views, respectively, of the lifting device in an extended state, in accordance with various embodiments.
Figure 8B:
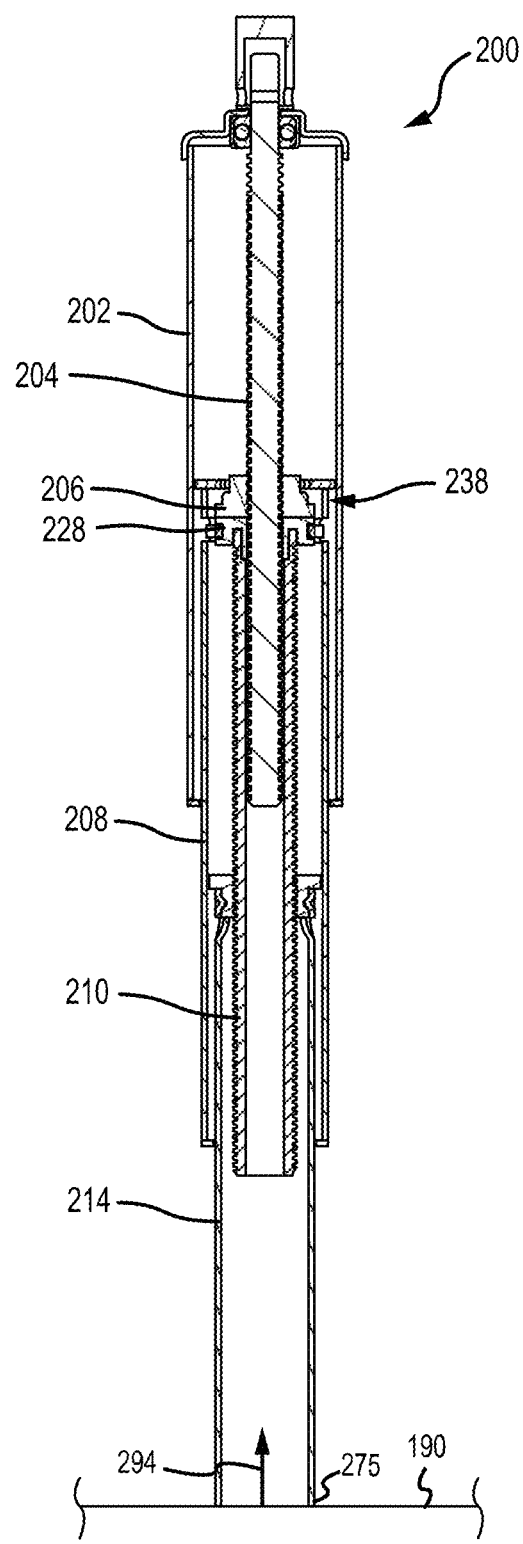

In operation, rotation of the first rotating screw 204 in a first rotational direction, e.g., via the handle 216, causes the second rotating screw 210 to rotate therewith with respect to the outer tube 202 and the second sleeve 214, thereby causing the second sleeve 214 to extend from the first sleeve 208 and the outer tube 202 (see FIG. 8A and FIG. 8B). Conversely, rotation of the first rotating screw 204 in a second rotational direction (opposite the first rotational direction) causes the second rotating screw 210 to rotate therewith with respect to the outer tube 202 and the second sleeve 214, which in turn causes the second sleeve 214 to retract into the first sleeve 208 (see FIG. 3A and FIG. 3B).

Furthermore, in a first mode with a head portion 236 of the first sleeve 208 engaged (e.g., interlocked) with the coarse nut 206, the coarse nut 206 can be restrained from rotating together with the first rotating screw 204 (e.g., via a dog clutch 238) so that the coarse nut 206 translates with respect to the first rotating screw 204 and the outer tube 202 in response to rotation of the first rotating screw 204. The first sleeve 208 can be coupled to the coarse nut 206 such that the first sleeve 208 translates with respect to the first rotating screw 204 and the outer tube 202 together with the coarse nut 206. The second sleeve 214 and the second rotating screw 210 are mounted to the first sleeve 208 such that the second sleeve 214 and the second rotating screw 210 translate together with the first sleeve 208 with respect to the outer tube 202 and the first rotating screw 204. In this regard, in the first mode, rotation of the first rotating screw 204 causes the first sleeve 208 and the second sleeve 214 to extend or retract (depending on the rotational direction of the first rotating screw 204) with respect to the outer tube 202 via the high-speed assembly. In addition to extension and retraction of the second sleeve 214 with respect to the outer tube 202 via the high-speed assembly in the first mode, rotation of the first rotating screw 204 causes the second sleeve 214 to extend or retract (depending on the rotational direction of the first rotating screw 204) with respect to the first sleeve 208 via the low-speed assembly.

In various embodiments, the dog clutch 238 includes a first plurality of teeth 240 (also referred to as dogs or dog gears) extending from the coarse nut 206 configured to interlock with a second plurality of teeth 242 (also referred to as dogs or dog gears) extending from the head portion 236 of the first sleeve 208. When engaged (i.e., the first plurality of teeth 240 are interlocked with the second plurality of teeth 242), the dog clutch 238 secures the coarse nut from rotating together with the first rotating screw 204 with respect to the outer tube 202 and the first sleeve 208.

In various embodiments, the coarse nut 206 can comprise a hollow shaft portion 244 having a threaded inner diameter surface configured to interface with the threads 232 of the first rotating screw 204. The thread pitch of the coarse nut 206 can be the same as the thread pitch of the first rotating screw 204. A flange 246 can extend outwardly from the hollow shaft portion 244. The flange 246 can be disposed at least partially in the first sleeve 208. The hollow shaft portion 244 can extend through the head portion 236 of the first sleeve 208. The head portion 236 can comprise a flange extending inward from the first sleeve 208. The second plurality of teeth 242 can be disposed on the head portion 236 (e.g., on the flange extending inward from the first sleeve 208). In various embodiments, the head portion 236 and the first sleeve 208 are two separate pieces coupled together. In various embodiments, the head portion 236 and the first sleeve 208 are formed as a single piece.

Figure 7:
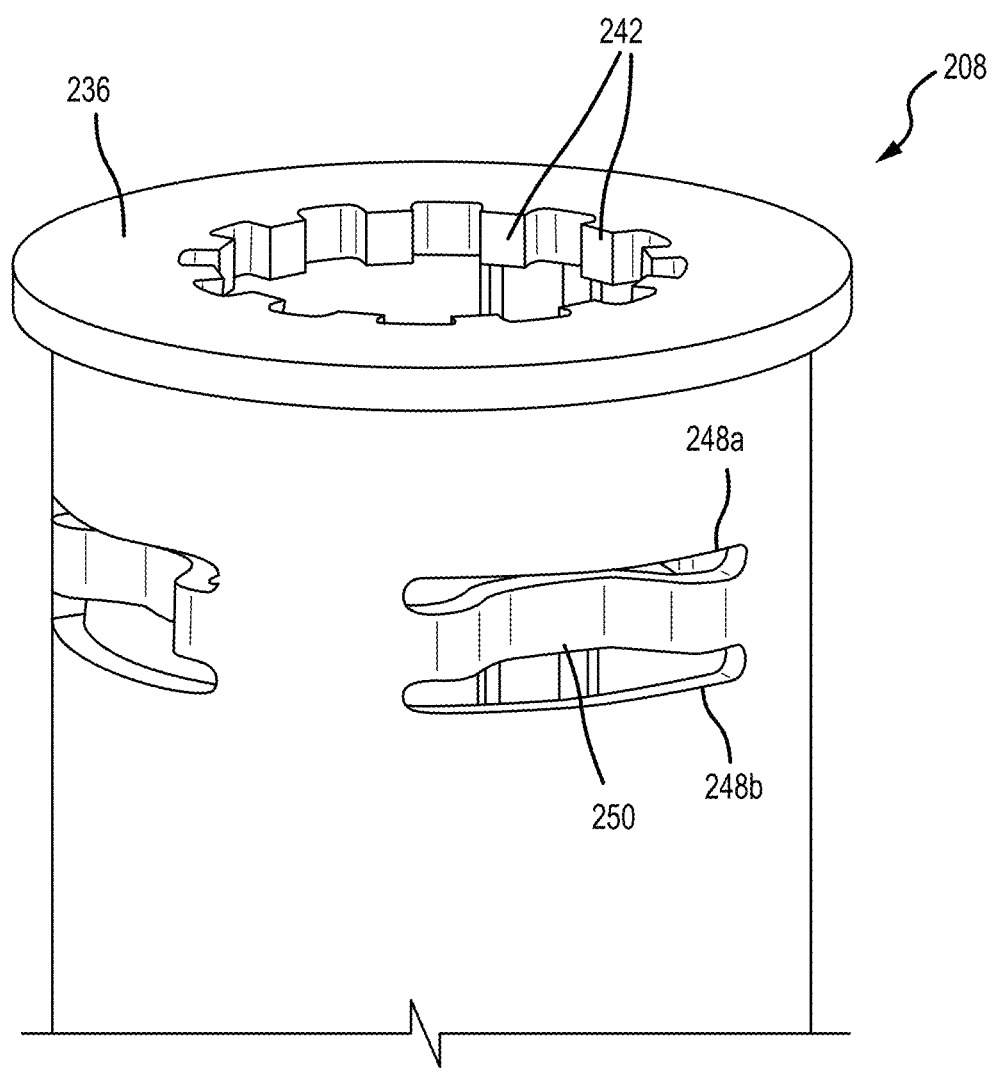
FIG. 7 is a perspective views of the top portion of a first sleeve having a plurality of teeth for meshingly engaging a coarse nut and a plurality of tabs for slidingly engaging a second rotating screw, in accordance with various embodiments.

With reference to FIG. 7, a perspective view of the upper end of the first sleeve 208 is illustrated, in accordance with various embodiments. The second rotating screw 210 can be rotatably coupled to the first sleeve 208 such that the second rotating screw 210 can rotate with respect to the first sleeve 208, while maintaining longitudinal position with respect to the first sleeve 208. Stated differently, the second rotating screw 210 can rotate with respect to the first sleeve 208 while translating together with the first sleeve 208. The first sleeve 208 can include a first cutout 248a and a second cutout 248b that define a tab 250 therebetween. A plurality of cutouts 248 and corresponding tabs 250 can be disposed circumferentially about the first sleeve 208, in accordance with various embodiments. The tab 250 can extend inwardly from the main body of the first sleeve 208 to couple with the head portion 228 of the second rotating screw 210. For example, with combined reference to FIG. 5 and FIG. 7 (also shown in FIG. 4), the tab 250 can be received in a cylindrical groove 252 disposed in the head portion 228 of the second rotating screw 210. The tab 250 can slidingly engage the head portion 228 at the cylindrical groove 252 such that the second rotating screw 210 can rotate with respect to the first sleeve 208 while simultaneously translating together with the first sleeve 208. Stated differently, the first sleeve 208 and the second rotating screw 210 are configured to translate together. In various embodiments, translation of the first sleeve 208 with respect to the outer tube 202 drives translation of the second rotating screw 210 with respect to the outer tube 202. The first sleeve 208 can be mechanically locked from translating along the centerline axis 292 with respect to the second rotating screw 210 via the cylindrical groove 252. Stated differently, the first sleeve 208 can be slidingly interlocked with the second rotating screw 210 via the cylindrical groove 252. Although illustrated as a tab 250 bent inward toward the centerline axis, the first sleeve 208 can be slidingly interlocked with the second rotating screw 210 via any suitable connection, such as a flange or ring member extending inwardly from the main body of the first sleeve 208.

Figure 8C:
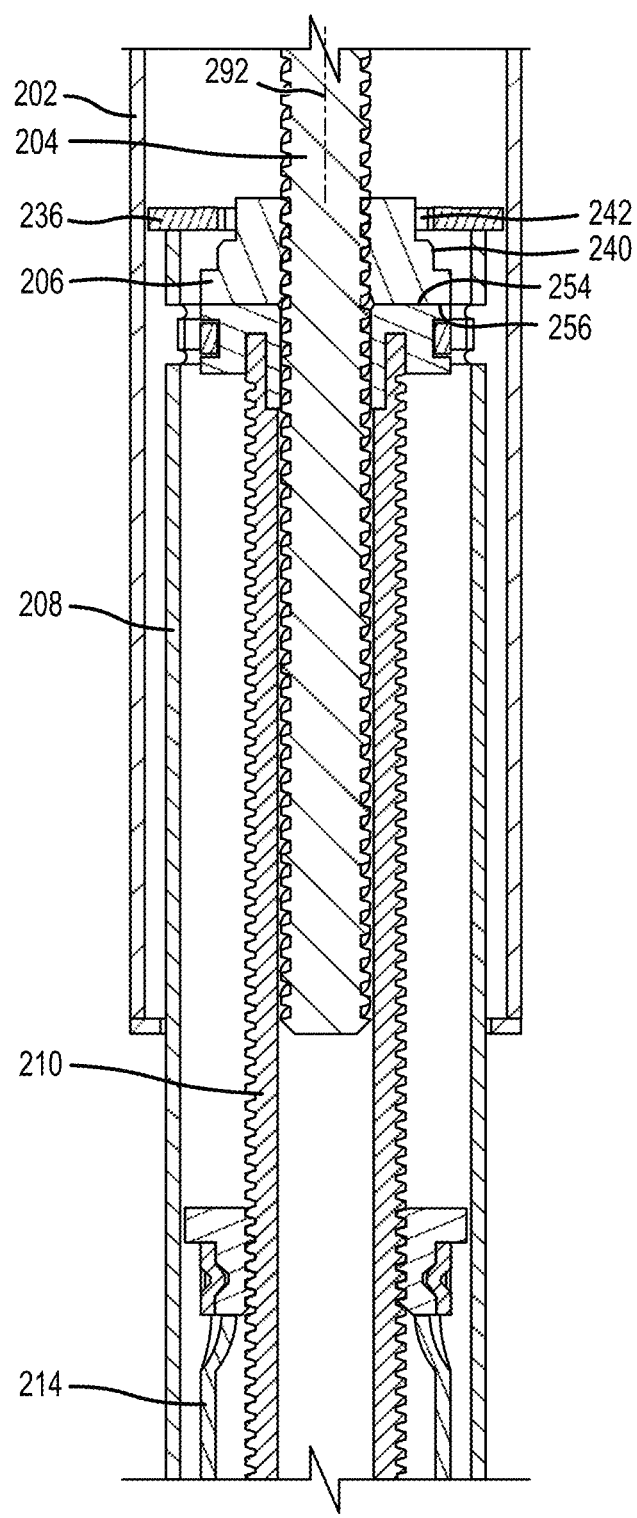
FIG. 8C is an enlarged section view of the lifting device of FIG. 8B, in accordance with various embodiments.

FIG. 8A and FIG. 8B are side and section views, respectively, of the lifting device 200 in an assembled state and in an extended position, in accordance with various embodiments. FIG. 8C is an enlarged section view of the lifting device 200 of FIG. 8B. With combined reference to FIG. 8A through FIG. 8C, the first sleeve 208 is movable between a first position (see FIG. 3B and FIG. 4) and a second position (see FIG. 8B and FIG. 8C) with respect to the coarse nut 206. In the first position, the dog clutch 238 is engaged (i.e., the first plurality of teeth 240 are interlocked with the second plurality of teeth 242). In the second position, the dog clutch 238 is disengaged (i.e., the first plurality of teeth 240 are not interlocked with the second plurality of teeth 242). With the head portion 236 of the first sleeve 208 disengaged from (i.e., the first plurality of teeth 240 are not interlocked with the second plurality of teeth 242) the coarse nut 206, the coarse nut 206 can rotate together with the first rotating screw 204. The dog clutch 238 can disengage in response to the first sleeve 208 translating to the second position with respect to the coarse nut 206. In various embodiments, the coarse nut 206 acts as a stopping surface for the second rotating screw 210 as the first sleeve 208 translates from the first position to the second position.

During operation, rotation of the first rotating screw 204 can cause the second sleeve 214 to extend. The second sleeve 214 can extend until the second sleeve 214 contacts a ground surface 190 (e.g., see FIG. 1 and FIG. 8B). In response to the second sleeve 214 contacting a ground surface, a reactive force (represented by arrow 294) can be transmitted up through the second sleeve 214, the second rotating screw 210, and into the first sleeve 208. This reactive force 294 can cause the first sleeve 208 to translate (e.g., upward) with respect to the outer tube 202 from the first position to the second position, thereby decoupling the first plurality of teeth 240 from the second plurality of teeth 242 (i.e., disengaging the dog clutch 238). With the dog clutch 238 disengaged, the coarse nut 206 can begin to rotate together with the first rotating screw 204 and the second rotating screw 210 and no longer translates along the first rotating screw 204.

In various embodiments, with the first sleeve in the second position, the head portion 228 of the second rotating screw 210 can contact the coarse nut 206. With particular focus on FIG. 8C, the head portion 228 can define an axially facing contact surface 254 configured to contact an axially facing contact surface 256 of the coarse nut 206. The contact surface 254 can face a first direction parallel to the centerline axis 292. The contact surface 256 can face a second direction parallel to the centerline axis 292, opposite the first direction faced by the contact surface 254. In various embodiments, the contact surface 254 and the contact surface 256 can each be oriented in a plane that is perpendicular to the centerline axis 292. A torque force can be imparted from the second rotating screw 210 to the coarse nut 206 via the first contact surface 254 and the second contact surface 256 which causes the coarse nut 206 to rotate together with the first rotating screw 204 and the second rotating screw 210. In this regard, the first contact surface 254 and the second contact surface 256 can form a "friction clutch" to impart rotational force from the second rotating screw 210 to the coarse nut 206. In various embodiments, a surface roughness of the first contact surface 254 and/or the second contact surface 256 can be increased to increase friction between the second rotating screw 210 and the coarse nut 206 and to prevent the second rotating screw 210 from slipping with respect to the coarse nut 206 when in the second mode.

Although the coarse nut 206 and the first sleeve 208 are no longer translating with respect to the first rotating screw 204 and the outer tube 202 in the second mode, the second rotating screw 210 continues to rotate with the first rotating screw 204 so that the second sleeve 214 translates with respect to the second rotating screw 210 and the outer tube 202. In this regard, in the second mode, rotation of the first rotating screw 204 causes the second sleeve 214 to extend or retract (depending on the rotational direction of the first rotating screw 204) with respect to the outer tube 202 via the low-speed assembly.

In operation and with the first sleeve 208 in the second position (e.g., with a ground force 294 reacted through the first sleeve 208), rotation of the first rotating screw 204 does not drive translation of the coarse nut 206 and the first sleeve 208 with respect to the outer tube 202. In this regard, in the second mode, rotation of the first rotating screw 204 in the first rotational direction or the second rotational direction may cause only the second sleeve 214 (and not the first sleeve 208) to translate with respect to the outer tube 202 and the first rotating screw 204. Stated differently, the high-speed assembly (i.e., the first sleeve 208) may be disengaged from operation in response to the first sleeve 208 being in the second position in the second mode. In this manner, in response to rotation of the first rotating screw 204 in the first direction, both the high-speed assembly (i.e., including the first sleeve 208) and the low-speed assembly (i.e., including the second sleeve 214) are driven to increase the overall length of lifting device 200 but, after reacting force from the ground through, for example, the second sleeve 214, the second rotating screw 210, and the first sleeve 208, rotation of the first rotating screw 204 and the second rotating screw 210 is only imparted to the low-speed assembly and not the high-speed assembly.

With momentary reference to FIG. 8B, as the overall length of the lifting device 200 is increased, the foot 275 of the lifting device 200, which can be attached to a lower end of the second sleeve 214 or can be the lower end of the second sleeve 214, may contact the ground surface 190, thereby imparting the reactive force 294 from the ground surface 190 into the second sleeve 214 and thereby the second rotating screw 210 and the first sleeve 208, which causes the first sleeve 208 to move with respect to the coarse nut 206 from the first position (i.e., disengaged from the coarse nut 206) to the second position (i.e., engaged with the coarse nut 206) thereby disengaging the dog clutch 238 and thereby disengaging the high speed assembly. In this regard, before the lifting device 200 has contacted a ground surface, the overall length of the lifting device 200 is quickly increased to reduce the overall number of rotations of the first rotating screw 204 needed to cause lifting device 200 to reach the ground surface 190. In response to contacting the ground surface 190, the high-speed assembly is decoupled from the first rotating screw 204 to take advantage of the mechanical advantage of the low-speed assembly. In this manner, time to operate is reduced relative to conventional designed and increased mechanical advantage is selectively activated.

Various components of the lifting device 200 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, or any other suitable metal or metal alloy. In this regard, the outer tube 202, the first sleeve 208, the second sleeve 214, the first rotating screw 204, and/or the second rotating screw 210 may be made from a metal or metal alloy. It is contemplated that various components of lifting device 200, such as the outer tube 202, may be made from a fiber-reinforced composite material.

Benefits and other advantages have been described herein with regard to specific embodiments. Furthermore, the connecting lines shown in the various figures contained herein are intended to represent example functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A linear jack, comprising:
    an outer tube defining a centerline axis;
    a first rotating screw mounted to the outer tube and extending coaxially along the centerline axis;
    a coarse nut threadedly coupled to the first rotating screw;
    a first sleeve received at least partially into the outer tube, the first sleeve is configured to translate with respect to the outer tube between a first retracted position and a first extended position;
    a second rotating screw in coaxial alignment with the first rotating screw, the second rotating screw is configured to rotate together with the first rotating screw; and
    a second sleeve received at least partially into the first sleeve, the second sleeve is configured to translate with respect to the first sleeve between a second retracted position and a second extended position, and the second sleeve is threadedly coupled to the second rotating screw;
    wherein the first sleeve is configured to translate with respect to the coarse nut between a first position, wherein the coarse nut is meshingly engaged with the first sleeve, and a second position, wherein the coarse nut is free to rotate together with the second rotating screw and the first rotating screw with respect to the first sleeve.

2. The linear jack of claim 1, wherein the second sleeve is configured to translate with respect to the second rotating screw in response to rotation of the first rotating screw.

3. The linear jack of claim 1, wherein, with the first sleeve in the first position, the first sleeve is configured to translate with respect to the outer tube in response to the first rotating screw rotating relative to the coarse nut.

4. The linear jack of claim 1, wherein the second rotating screw is configured to translate with respect to the first rotating screw in response to rotation of the first rotating screw with respect to the outer tube.

5. The linear jack of claim 4, wherein the second rotating screw is configured to receive at least a portion of the first rotating screw.

6. The linear jack of claim 1, further comprising a dog clutch disposed between the first sleeve and the coarse nut, and with the first sleeve in the first position the dog clutch secures the coarse nut from rotating together with the first rotating screw.

7. The linear jack of claim 6, wherein the dog clutch includes a first plurality of teeth extending from the coarse nut and a second plurality of teeth extending from the first sleeve, the first plurality of teeth are interlocked with the second plurality of teeth in response to the first sleeve moving to the first position, and the first plurality of teeth are disengaged from the second plurality of teeth in response to the first sleeve moving to the second position so that the coarse nut is free to rotate together with the second rotating screw and the first rotating screw.

8. The linear jack of claim 1, wherein a first thread pitch of the first rotating screw is greater than a second thread pitch of the second rotating screw.

9. The linear jack of claim 1, wherein the coarse nut provides a stopping surface that engages a head portion of the second rotating screw to stop the second rotating screw from translating with respect to the first sleeve when the first sleeve moves to the second position.

10. The linear jack of claim 1, wherein turning the first rotating screw a first rotational direction extends the second sleeve from the first sleeve, and turning the first rotating screw a second rotational direction retracts the second sleeve into the first sleeve, regardless of the first sleeve being in the first position or the second position.

11. The linear jack of claim 1, wherein the outer tube, the first sleeve, the second sleeve, the first rotating screw, and the second rotating screw are in coaxial alignment.

12. A linear jack, comprising:
    an outer tube defining a centerline axis;
    a first rotating screw configured to rotate relative to the outer tube;
    a coarse nut threadedly coupled to the first rotating screw;
    a first sleeve received at least partially into the outer tube, the first sleeve is configured to translate with respect to the outer tube between a retracted position and an extended position;
    a second rotating screw configured to rotate together with the first rotating screw, the first rotating screw is configured to drive rotation of the second rotating screw, and the second rotating screw includes a cylindrical groove whereby the second rotating screw is slidingly interlocked with the first sleeve; and a second sleeve received at least partially into the first sleeve, the second sleeve is threadedly coupled to the second rotating screw.

13. The linear jack of claim 12, wherein the first sleeve is movable with respect to the coarse nut between a first position, wherein the coarse nut is meshingly engaged with the first sleeve, and a second position, wherein the coarse nut is free to rotate with respect to the first sleeve.

14. The linear jack of claim 13, wherein, with the first sleeve in the first position, the first rotating screw and the second rotating screw rotate relative to the coarse nut so as to cause the coarse nut, the first sleeve, and the second rotating screw to translate relative to the first rotating screw.

15. The linear jack of claim 12, wherein:
the second rotating screw is configured to translate with respect to the first rotating screw in response to rotation of the first rotating screw with respect to the coarse nut; and the second sleeve is configured to translate with respect to the second rotating screw in response to rotation of the first rotating screw and the second rotating screw.

16. The linear jack of claim 12, wherein the second rotating screw is slidingly coupled to the first rotating screw.

17. The linear jack of claim 12, further comprising at least one tab extending from the first sleeve into the cylindrical groove whereby the first sleeve is slidingly interlocked with the second rotating screw.

18. The linear jack of claim 12, wherein the coarse nut comprises a hollow shaft portion having a threaded inner diameter surface configured to interface with a thread of the first rotating screw and a flange extending outwardly from the hollow shaft portion, and the flange is disposed at least partially in the first sleeve.

19. A method of manufacturing a linear jack, comprising:
disposing a first rotating screw at least partially within a coarse nut, wherein the first rotating screw is threadedly coupled to the coarse nut;

disposing a second rotating screw at least partially within a second sleeve, wherein the second rotating screw is threadedly coupled to the second sleeve;

disposing the first rotating screw at least partially within the second rotating screw, wherein the first rotating screw is slidingly coupled to the second rotating screw;

disposing the second sleeve at least partially within a first sleeve, wherein the second sleeve is configured to translate with respect to the first sleeve, and the first sleeve is movable between a first position, wherein the coarse nut is meshingly engaged with the first sleeve, and a second position, wherein the coarse nut is free to rotate together with the second rotating screw and the first rotating screw with respect to the first sleeve.

20. The method of claim 19, further comprising:
disposing the first sleeve within an outer tube, wherein the first sleeve is configured to translate with respect to the outer tube, and the second sleeve is configured to translate together with the first sleeve with respect to the outer tube; and coupling the first rotating screw to the outer tube, wherein the first rotating screw is configured to rotate with respect to the outer tube.

* * * * *